(12) United States Patent
Sim et al.

(10) Patent No.: US 8,896,658 B2
(45) Date of Patent: Nov. 25, 2014

(54) INTERFACE FOR VOICE COMMUNICATIONS

(75) Inventors: Wong Hoo Sim, Singapore (SG); Seh Eing Lim, Singapore (SG); Kok Hoong Vincent Cheng, Singapore (SG); Boon Keat Eddy Toh, Singapore (SG)

(73) Assignee: Creative Technology Ltd, Singapore (SG)

( * ) Notice: Subject to any disclaimer, the term of this patent is extended or adjusted under 35 U.S.C. 154(b) by 1533 days.

(21) Appl. No.: 12/100,599

(22) Filed: Apr. 10, 2008

(65) Prior Publication Data

US 2009/0257574 A1 Oct. 15, 2009

(51) Int. Cl.
*H04N 7/14* (2006.01)
*G06F 15/16* (2006.01)
*G06Q 10/10* (2012.01)

(52) U.S. Cl.
CPC .................................... *G06Q 10/107* (2013.01)
USPC .................. 348/14.08; 348/14.02; 348/14.09; 709/205

(58) Field of Classification Search
CPC ............ H04L 12/1813; H04L 12/1822; H04L 12/1831; H04L 65/403; H04M 3/567; H04N 7/15
See application file for complete search history.

(56) References Cited

U.S. PATENT DOCUMENTS

| | | | |
|---|---|---|---|
| 6,624,827 B1* | 9/2003 | Hwang et al. .................. | 715/753 |
| 2002/0093531 A1* | 7/2002 | Barile ............................ | 345/753 |
| 2004/0117445 A9* | 6/2004 | Lee et al. ....................... | 709/205 |
| 2006/0031291 A1* | 2/2006 | Beckemeyer .................. | 709/204 |
| 2006/0132596 A1* | 6/2006 | Ahonen ........................ | 348/14.09 |
| 2006/0164552 A1* | 7/2006 | Cutler ........................... | 348/576 |
| 2007/0260684 A1* | 11/2007 | Sharma et al. ................ | 709/204 |
| 2009/0016512 A1* | 1/2009 | Bryant et al. ............. | 379/202.01 |
| 2009/0046139 A1* | 2/2009 | Cutler et al. ............... | 348/14.08 |
| 2010/0077319 A1* | 3/2010 | Xu et al. ....................... | 715/753 |

* cited by examiner

*Primary Examiner* — Wesley Kim
(74) *Attorney, Agent, or Firm* — Russell Swerdon; Desmund Gean

(57) ABSTRACT

There is provided an interface viewable on a display for a communications apparatus used during a session for voice communications between at least two parties. The interface includes at least one edge of the display having a row of objects, each object of the row being for representing each of the at least two parties; and a main portion of the display being for showing the object of the party speaking at a particular point in time, with a plurality of the objects being shown when a plurality of the parties are speaking at the particular point in time. Advantageously, the object of the speaking party is shown on the main portion when the speaking party's voice is detected by the speaking party's communications apparatus, a host server receiving information from the speaking party's communications apparatus to aid in displaying the object of the speaking party at the particular point in time. Alternatively, the object of the speaking party may also undergo a change of state, such as, for example, a blinking effect, a single occurrence resizing effect, a transitional blurring effect, a repeated resizing effect, and any combination of the aforementioned.

11 Claims, 6 Drawing Sheets

INTERFACE FOR VOICE COMMUNICATIONS

FIELD OF INVENTION

The present invention relates to the field of voice communications, particularly in relation to an interface which facilitates voice communications.

BACKGROUND

Technology has been evolving at a rapid pace in the field of communications, such that common forms of communication are no longer limited to telephone calls, facsimiles, telexes and the like. The increasing reach of the internet coupled with increases in data transmission rates have significantly broadened the forms of communication which are readily available for every person. In light of such developments, it is highly likely that an increasing number of people will change their preferred form of communication to one which utilizes data transmission over the internet.

With this change in the preferred form of communication, it is foreseeable that a manner which people communicate would also differ. Consequently, people may use communication devices which differ significantly than the ubiquitous communication device of this generation, namely, the mobile phone. This seismic change in the type of communication device being used has already been demonstrated in the days when paging devices were swapped for mobile phones. A repeat of such a similar event would be highly likely in the coming years.

In this regard, the use of purely verbal communication would become increasingly uncommon, and interfaces for communication would need to adapt to changes in the manner of communication. Thus, the present invention aims to optimize the interface for communication to meet the demands of upcoming forms of communication.

SUMMARY

In a first embodiment, there is provided an interface viewable on a display for a communications apparatus used during a session for voice communications between at least two parties. The interface includes at least one edge of the display having a row of objects, each object of the row being for representing each of the at least two parties; and a main portion of the display being for showing the object of the party speaking at a particular point in time, with a plurality of the objects being shown when a plurality of the parties are speaking at the particular point in time. Advantageously, the object of the speaking party is shown on the main portion when the speaking party's voice is detected by the speaking party's communications apparatus, a host server receiving information from the speaking party's communications apparatus to aid in displaying the object of the speaking party at the particular point in time. It is preferable that the edge is at, for example, left edge, right edge, bottom edge and top edge.

It is preferable that the object is selected from, for example, a live video image of each party, a pre-recorded video image of each party, a still picture of each party, an animated representation of each party, or a still representation of each party. The interface may include a sub-portion of the display being for showing a text-identifier of the party speaking at a particular point in time.

It is advantageous that the interface may further include a capability to compose and transmit a text message to a party by selecting an object of the party, where composing and transmitting the text message is done using controls in a sub-window in the display. However the capability to compose and transmit a text message amongst parties may be disabled by a party such as, for example, an initiator of the communications session, a hierarchical superior of the other parties in the communications session, or a user of specific types of communications apparatus.

The interface may also include a capability to compose and transmit an email message, wherein composing and transmitting the email message is done using controls in a separate email application.

The main portion of the display may show content provided by one of the parties relating to a topic for discussion at a particular point in time. The interface may be hosted and controlled by the host server, the host server receiving information from a plurality of communications apparatus and controlling the content to show on the interface on displays for each communications apparatus involved in the voice communications. Preferably, a plurality of the content is organized in a manner of either a row-column grid arrangement or a layering arrangement. The content may be, for example, graphs, slide presentations, pictures, and videos. It is preferable that the plurality of objects is organized in a manner of either a row-column grid arrangement or a layering arrangement.

Advantageously, the interface may also include a secondary portion of the display for showing notes recorded by a party of the communications session. However, there may be restricted access to the secondary portion of the display, with access dependent upon either hierarchical level of a party or type of communications apparatus being used in the communications session.

In a second embodiment, there is provided an interface viewable on a display for a communications apparatus used during a session for voice communications between at least two parties. The interface includes at least one edge of the display having a row of objects, each object of the row being for representing each of the at least two parties; and a main portion of the display being for showing content relating to a topic for discussion at a particular point in time, with a plurality of the content being shown when a plurality of the parties are presenting content at the particular point in time. It is advantageous that the object of the speaking party is shown to change state at the row of objects when the speaking party's voice is detected by the speaking party's communications apparatus, a host server receiving information from the speaking party's communications apparatus to aid in identifying the identity of the speaking party at the particular point in time.

Preferably, the object is selected from, for example, a live video image of each party, a pre-recorded video image of each party, a still picture of each party, an animated representation of each party, or a still representation of each party. The change of state may be, for example, a blinking effect, a single occurrence resizing effect, a transitional blurring effect, a repeated resizing effect, and any combination of the aforementioned.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
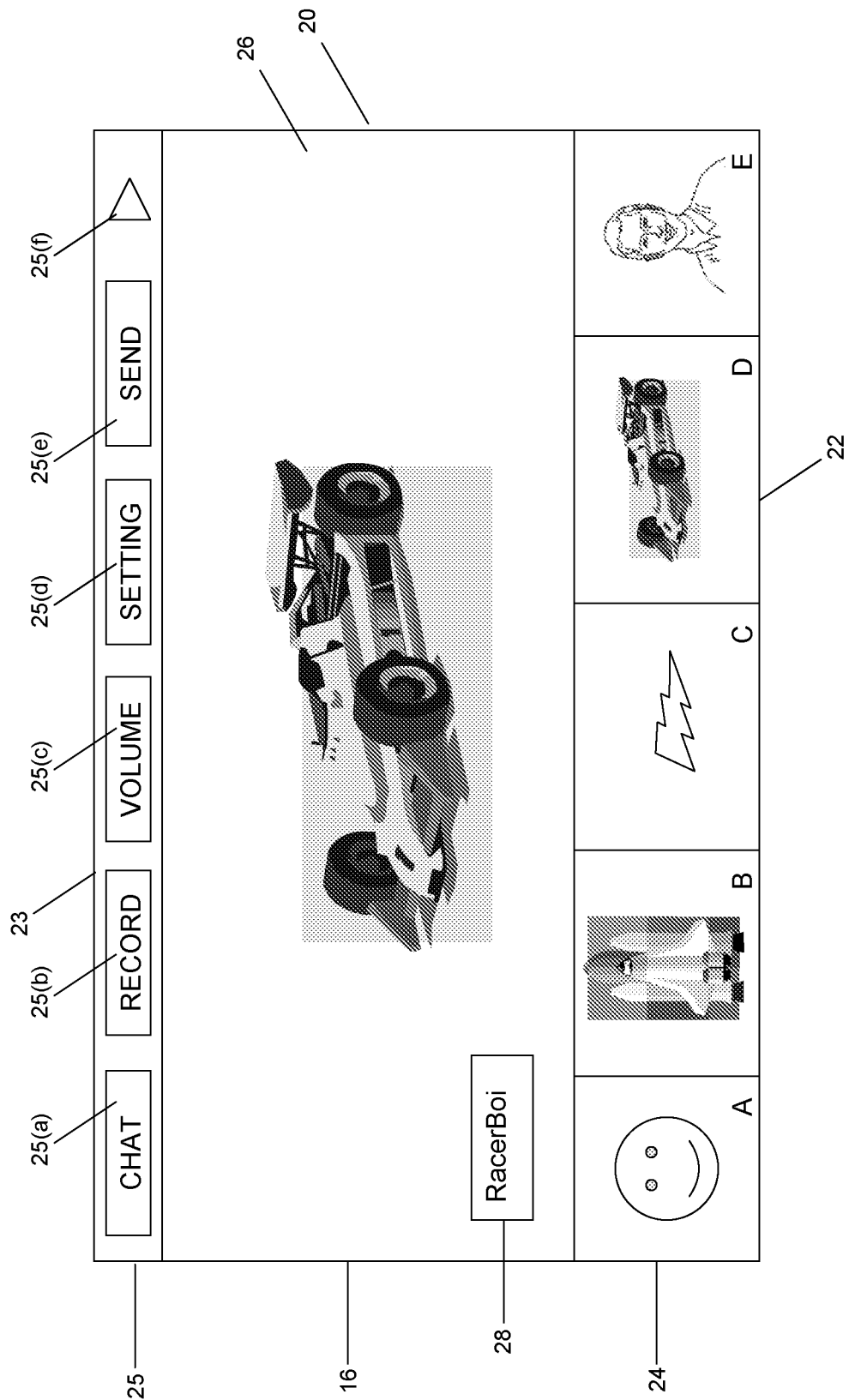
FIG. 1 shows a first embodiment of an interface of the present invention.
Figure 5:
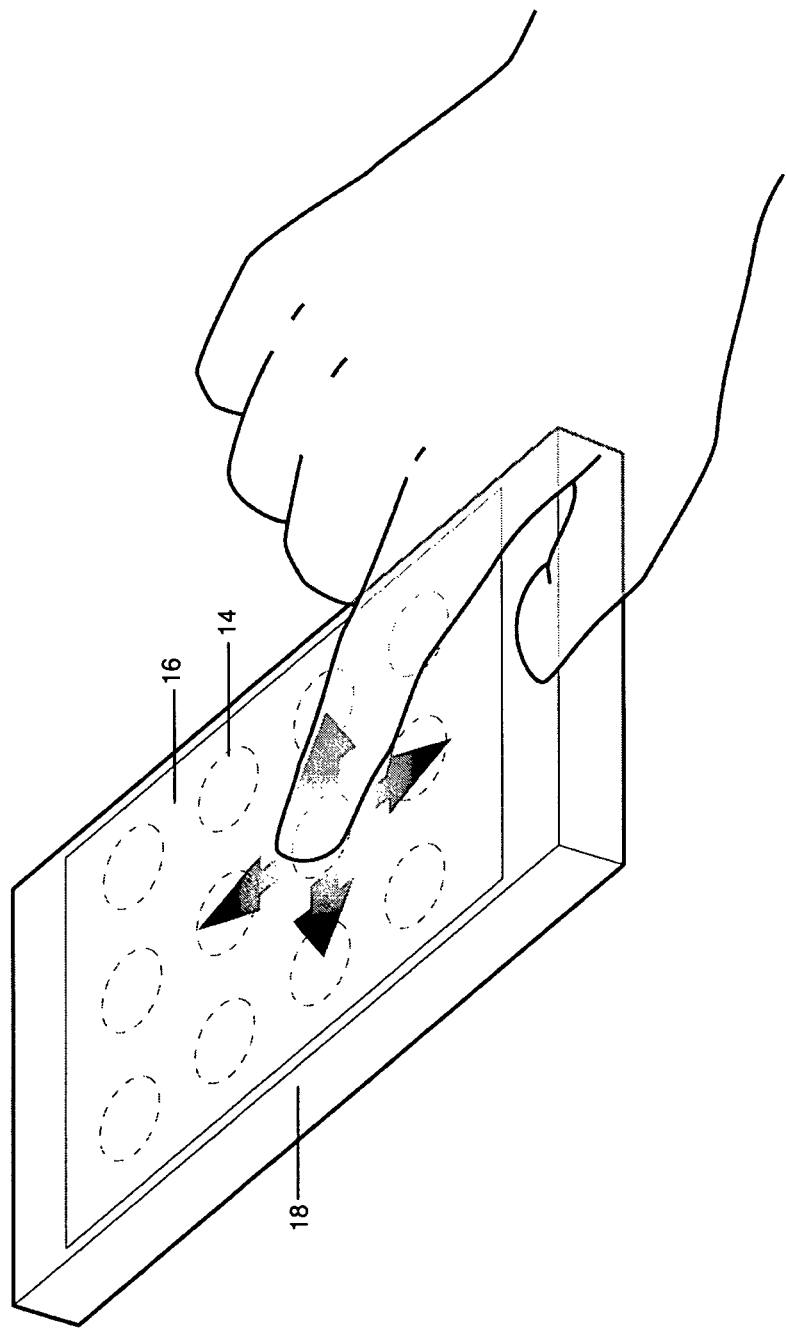
FIG. 5 shows an example of a communications apparatus used with the present invention.

With reference to FIG. 1, there is shown a first embodiment of an interface 20 viewable on a display for a communications apparatus. An example of the communications apparatus 18 is shown in FIG. 5. The communications apparatus 18 may be any device which allows communications between a plurality of different parties on at least one communications network. It should be noted that communications include, and is not limited to, voice conferencing, video conferencing and the like. In FIG. 5, a display 16 is shown to be have virtual buttons 14 which may be activated because the display 16 is made from a panel which is sensitive to touch (ie. a touch screen). The display 16 may be either a resistive panel or a capacitive panel. The interface 20 may be generated on the display 16. While the display 16 is shown to be part of a handheld device, it should be understood that the interface 20 may also be applied to displays of any size, the displays being part of or functionally connected to an communications apparatus.

Figure 6:
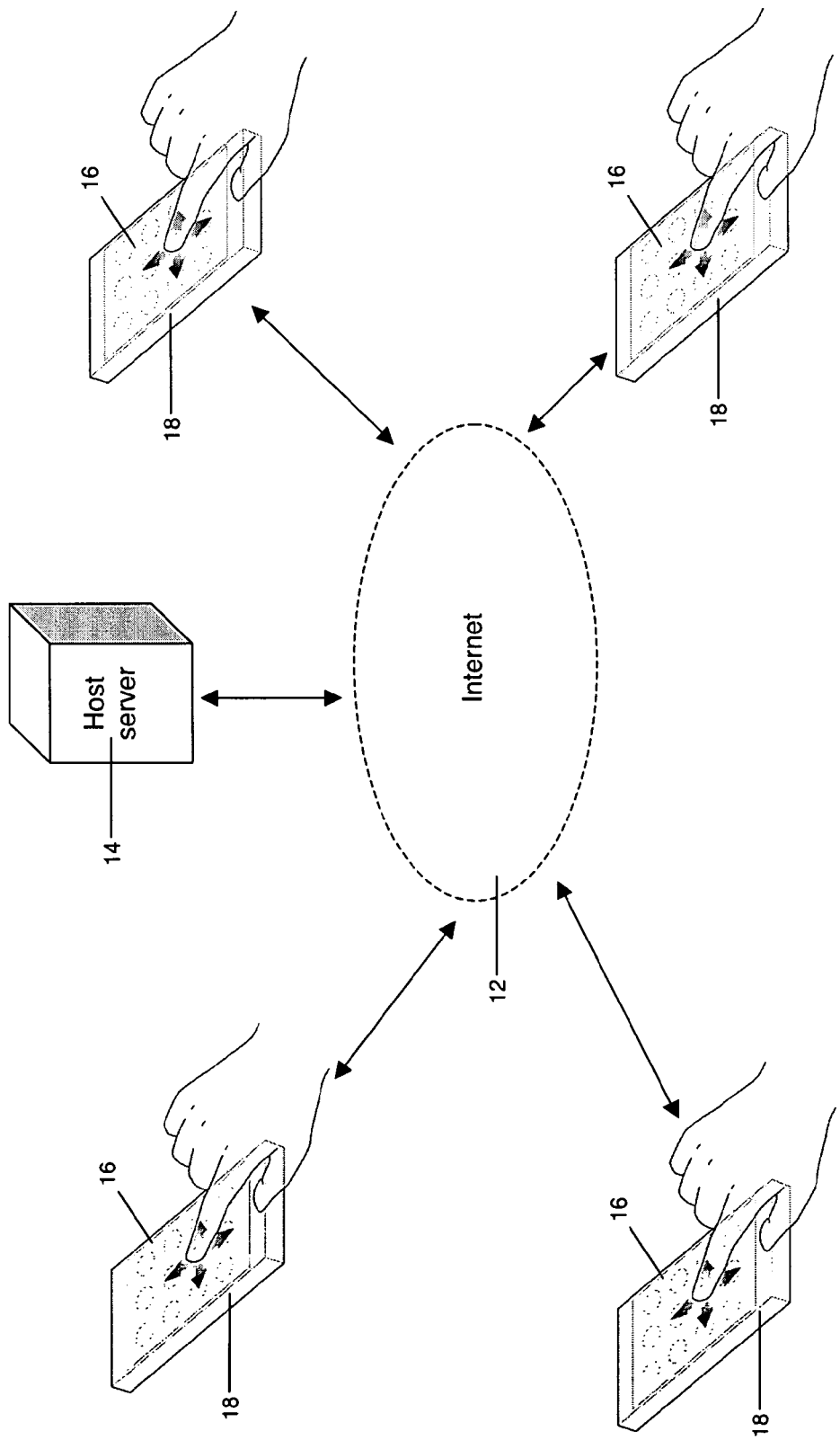
FIG. 6 shows an overview of a system which supports the interface of the present invention.

FIG. 6 shows an overview of a system 10 which includes a plurality of the communications apparatus 18. The plurality of communications apparatus 18 are linked together using the internet 12 (ie each of the communications apparatus 18 is logged into the internet 12), and the interface 20 appearing on the display 16 of each communications apparatus 18 is hosted and controlled by at least one host server 14. The at least one host server 14 may also serve as a storage facility for each party in the communication session, where the storage facility is used to stored data such as, for example, recorded communication sessions, data belonging to a user of each communications apparatus 18 and so forth.

The interface 20 may be invoked during a communication session between at least two parties. It should be noted that the communication session is not limited to communications utilising only voice, but relates to communications which includes a voice communication aspect like video conferencing. Referring to FIG. 1, the interface 20 includes a first edge 22 of the display 16 having a first row 24 of objects. Each object is shown to be denoted by A, B, C, D, and E. Each object (A, B, C, D, and E) of the first row 24 represents each party in the communication. The first edge 22 may be selected from: a left edge, a right edge, a bottom edge (as shown) and a top edge of the display 16. The first row 24 may be located at an edge which is preferred/defined by a user. The first row 24 may be in close proximity to the first edge 22 rather than at the first edge 22.

Each object (A, B, C, D, and E) may be, for example, a live video image of each party in the communication session (not able to be properly expressed in FIG. 1), a pre-recorded video image of each party in the communication session (not able to be properly expressed in FIG. 1), a still picture of each party in the communication session (like E), an animated representation of each party in the communication session (not able to be properly expressed in FIG. 1), a still representation of each party in the communication session (like A, B, C and D) and the like. It should be noted that the animated representation of each party includes a form of a three dimensional avatar.

Figure 4:
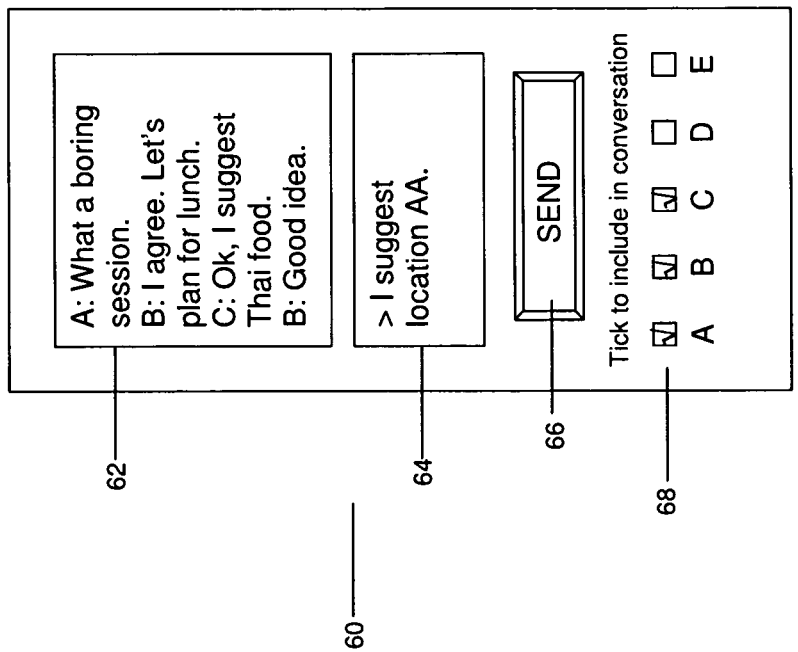
FIG. 4 shows a first embodiment of a messaging sub-window used in the interface of the present invention.

The interface 20 may also include a second edge 23 of the display 16 having a second row 25 of controls, like, for example, "chat" 25(a) to invoke a messaging sub-window 60 as shown in FIG. 4, "record" 25(b) to commence recording of a communication session (depending on a preference of a user of each communications apparatus 18, it may be stored either on the communications apparatus 18 or the at least one host server 14), "volume" 25(c) to invoke volume controls during the communication session, "setting" 25(d) to invoke video controls during the communication session, "send" 25(e) to transmit data used for the communication session, "▶" 25(f) to reveal more controls. It should be noted that the aforementioned controls are merely illustrative and neither the order nor the functionality is meant to be limiting in any manner. The second edge 23 may be selected from: a left edge, a right edge, a bottom edge and a top edge (as shown) of the display 16. The second row 25 may be located at an edge which is preferred by a user. The second row 25 may be in close proximity to the second edge 23 rather than at the second edge 23.

The interface 20 also includes a main portion 26 of the display 16 being for showing the object of the party speaking at a particular point in time. In FIG. 1, the object D is shown in the main portion 26 of the display 16, denoting/identifying that party D is speaking at the particular point in time. The speaking party's voice is detected by the speaking party's communications apparatus 18 (possibly using a microphone), and such information relating to the voice detection is relayed to the host server 14. The information relayed to the host server 14 enables the host server 14 to identify the speaking party's communications apparatus 18 and correspondingly display the appropriate object of the speaking party. This enables the host server 14 to display the speaking party's object on the interface 20 shown on displays 16 on each of the plurality of communications apparatus 18 involved in the communications session with each other. A plurality of the objects may be shown in the main portion 26 of the display 16 when a plurality of the parties are speaking concurrently at the particular point in time (not shown in FIG. 1 to avoid confusion). In such an instance, the plurality of the objects may be arranged in an organized manner in the main portion 26 such that the speaking parties are depicted in the main portion 26 at the particular point in time. The organized manner may be in the form of either a row-column grid arrangement, or a layering arrangement.

The interface 20 may also include a sub-portion 28 of the interface 20 for showing a text-identifier of the party(s) speaking at a particular point in time. The text-identifier may be, for example, a name, a pseudo identity, a code and so forth. In this example as shown in FIG. 1, party D has a pseudo identity of "RacerBoi". The sub-portion 28 may be located at any position in the display 16, not necessarily within the main portion 26 as shown.

Figure 3:
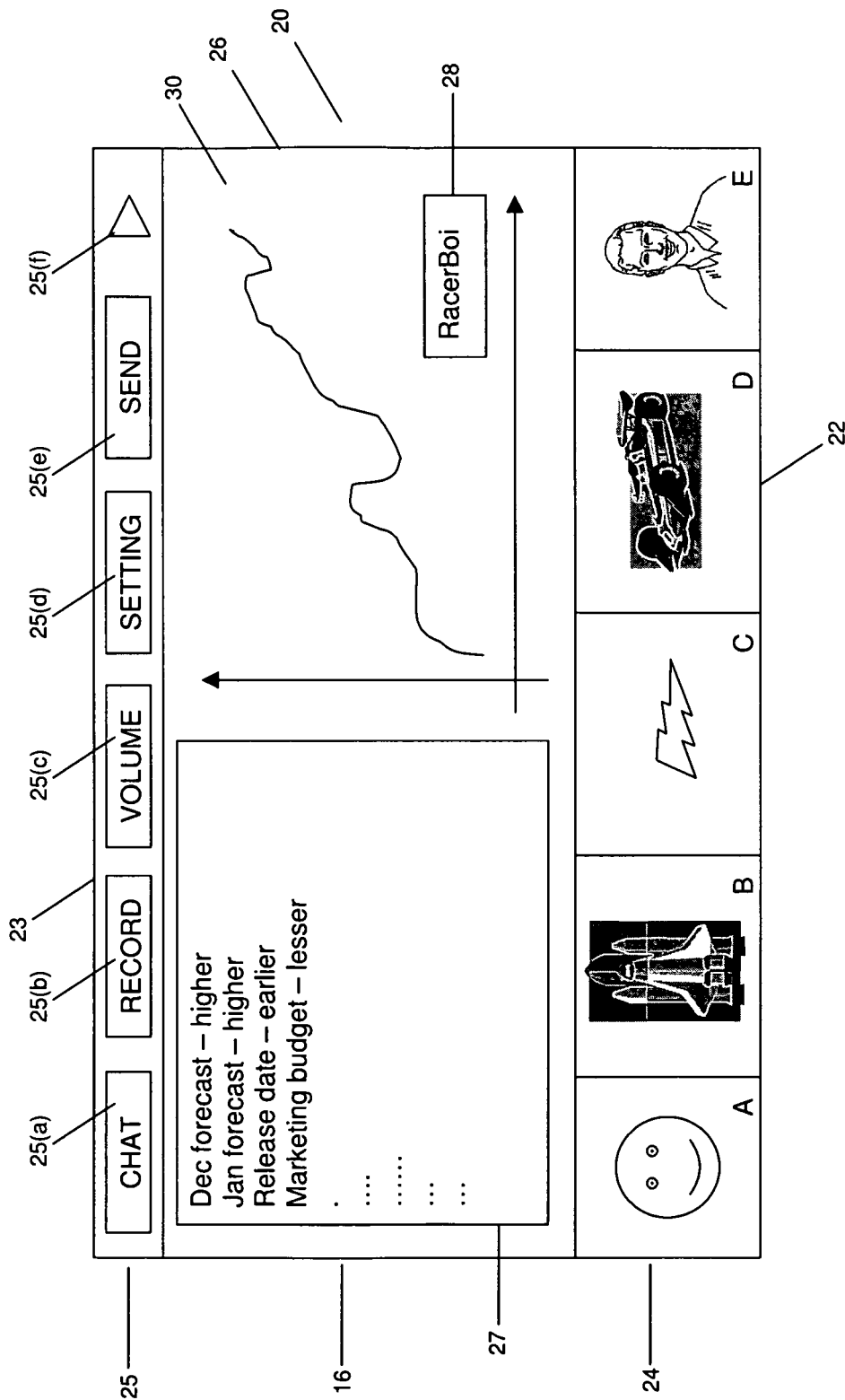
FIG. 3 shows a third embodiment of the interface of the present invention.

Referring to FIG. 3, there is shown another embodiment of the interface 20. In this embodiment, the main portion 26 may show content 30 relating to a topic for discussion at a particular point in time, and a secondary portion 27 shows notes recorded by a party of the communications session. The content 30 may be a specific data file that may be transmitted to all parties of the communications session in a manner akin to file sharing if it is not desirable for the content of the specific data file to be viewed in the main portion 26. The secondary portion 27 may not be viewable/accessible by all parties of the communications session. One such instance of restricted access relates to a situation where parties at different levels of an organizational hierarchy attend the same communications session. The secondary portion 27 may not be accessible by parties at lower levels of the organizational hierarchy. As such, an access level/access rights of a user may be either stored in each communications apparatus 18 or stored on the at least one host server 14. The access level/access rights of the user may also be dependent on the type of the communications apparatus 18 (ie hardware dependent). The content 30 may be provided by at least one of the communicating parties during the communication session using the "send" 25(e) control.

The interface 20 is hosted and controlled by the host server 14. The host server 14 receives information from the plurality of communications apparatus 18 and controls (determines) the content 30 shown on the interface 20 on displays 16 for each communications apparatus 18 involved in the communications session. When a plurality of the parties are presenting content 30 simultaneously, the host server 14 may arrange the presentation of the content 30 in accordance to a set of rules. The set of rules may include, for example, a first-in-first-out rule, prioritization of content based on hierarchical rank of the communicating party, prioritization of content based on type of communications apparatus used and so forth.

The plurality of the content 30 may be arranged by the host server 14 in an organized manner in the main portion 26 on the display 16 of each communications apparatus 18 such that it is visibly comprehensible by all parties of the communications session. The organized manner may be in the form of either a row/column grid arrangement or an overlaying arrangement. The content 30 may include, for example, graphs (as shown), slide presentations, still images, videos and so forth. In this embodiment, it would be possible for a user with the appropriate access level/access rights to visually ascertain the topic undergoing discussion, review discussion notes (ascertained by looking at the secondary portion 27) and the identity of the speaking party(s) (ascertained by looking at the sub-portion 28) just by referring to interface 20 shown on the display 16 of the communications apparatus 18.

The interface 20 may further include a functionality to compose and transmit a text message to any party participating in the communications session. This functionality may be invoked when the "chat" 25(a) control is triggered. Triggering the "chat" 25(a) control activates the messaging sub-window 60 as shown in FIG. 4. The texting of messages between the plurality of users may be carried out concurrently during the communications session. The texting of messages allow communication between parties involved in the communication session without the knowledge of parties who are either not supposed or not required to know about the texting-based communication. Thus, a degree of confidentiality is enabled with such texting-based communication. It should be noted that the functionality of texting of messages during a communication session may be disabled if desired/necessary. The disabling of this functionality may be done by one of the parties in the communications session. This party may be, for example, an initiator of the communications session, a hierarchical superior (in an organization) of the other parties in the communications session, a user of specific types of communications apparatus 18 and so forth. Typically, the party in the communication session who is the hierarchical superior would have more control over proceedings of the communications session, specifically as they would have access to more available options when triggering the "▶" 25(f) of the interface 20. This may apply to users of specific types of communications apparatus 18 as well.

FIG. 4 shows a first embodiment of a messaging sub-window 60 used in the interface 20. The messaging sub-window 60 appears when a party participating in the communication session selects the "chat" 25(a) control in the interface 20. The composition and transmission of the message is done using controls in the sub-window 60. A first panel 62 of the sub-window 60 shows texting which has taken place between parties involved in the texting session. A second panel 64 of the sub-window 60 shows text input by a party participating in the texting session prior to transmission to the other parties of the texting session. A "send" button 66 is activated to transmit text in the second panel 64 to all parties of the texting session. Finally, the sub-window 60 may include a series 68 of selector boxes where all parties of the texting session would be able to select which parties to include in the texting session. Instead of using texting as mentioned in the previous paragraph, the interface 20 may also include an application where parties of the communications session are able to email one another as emails are typically easily referenced and archived when compared to a chain of textings. The email application may include existing applications such as, for example, Lotus Notes and Microsoft Outlook. Alternatively, the email application may be a proprietary application which mimics the look-and-feel of the interface 20. As per typical email applications, it is evident that emails sent during the communications session would not require immediate replies unlike the texting session as mentioned earlier.

Figure 2:
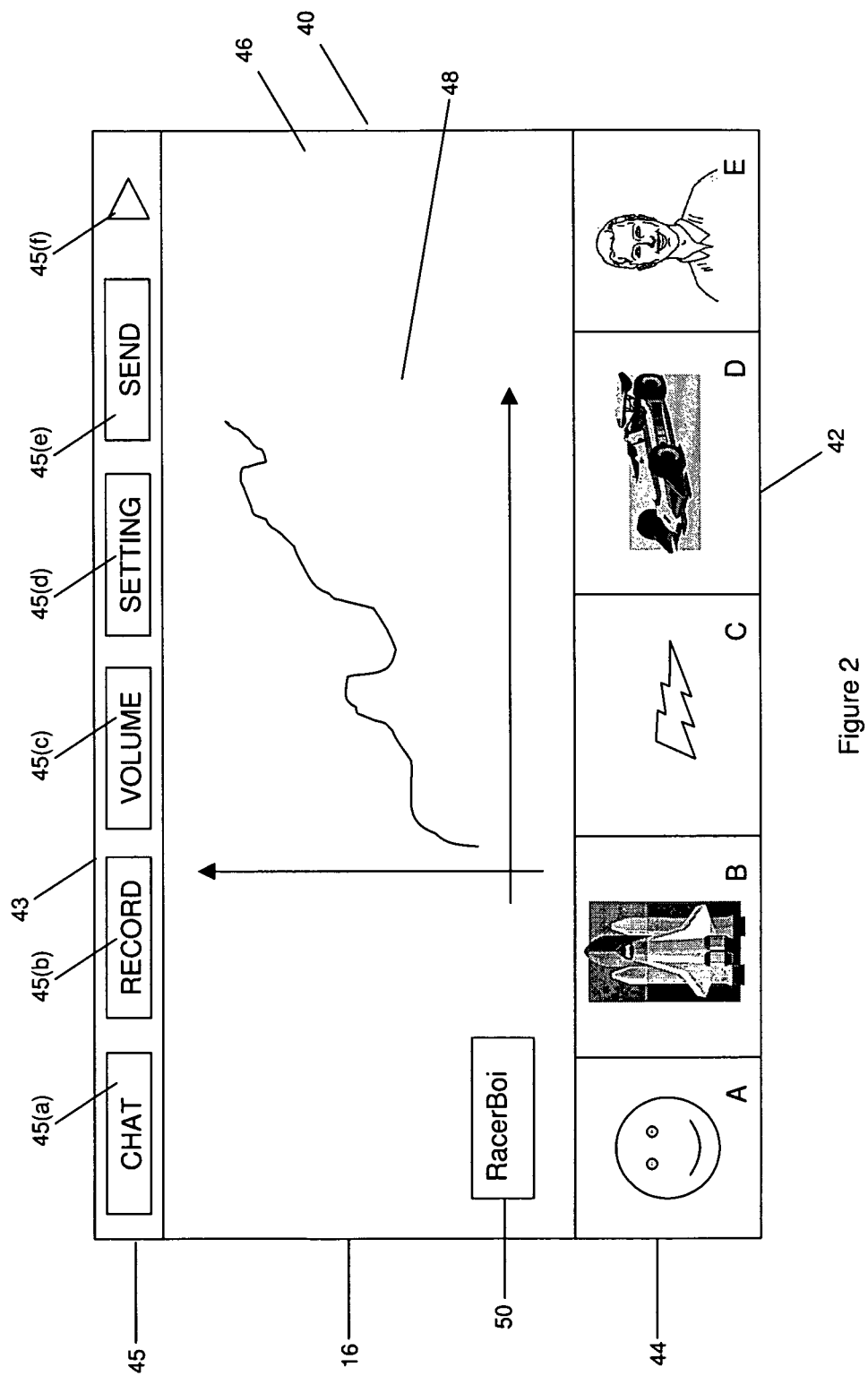
FIG. 2 shows a second embodiment of the interface of the present invention.

In another embodiment as shown in FIG. 2, there is also shown an interface 40 viewable on a display for a communications apparatus used during a communications session between at least two parties. An example of the communications apparatus 18 is shown in FIG. 5. The communications apparatus 18 may be any device which allows communications between different parties. In FIG. 5, a display 16 is shown to be have virtual buttons 14 which may be activated because the display 16 is made from a panel which is sensitive to touch (ie. a touch screen). The display 16 may be either a resistive panel or a capacitive panel. The interface 40 may be seen on the display 16. While the display 16 is shown to be part of a handheld device, it should be understood that the interface 40 may also be applied to displays of any size, the displays being part of or functionally connected to communications apparatus.

FIG. 6 shows an overview of a system 10 which incorporates a plurality of the communications apparatus 18. The plurality of communications apparatus 18 are linked together using the internet 12, and the interface 40 appearing on each communications apparatus 18 is hosted and controlled by at least one host server 14. The at least one host server 14 may also serve as a storage facility for each party in the communication session, where the storage facility is used to stored recorded communication sessions.

The interface 40 may be used during a communication session between at least two parties. It should be noted that the communication session is not limited to communications utilising only voice, but relates to communications which includes a voice communication aspect like video conferencing. Referring to FIG. 2, the interface 40 includes a third edge 42 of the display 16 having a third row 44 of objects. Each object is shown to be denoted by A, B, C, D, and E. Each object (A, B, C, D, and E) of the third row 44 is for representing each party in the communication. The third edge 42 may be selected from a left edge, a right edge, a bottom edge (as shown) and a top edge of the display 16. The third row 44 may be located at an edge which is preferred by the user. It is not necessary for the third row 44 to be located at the third edge 42. The third row 44 may be in close proximity to the third edge 42 rather than at the third edge 42.

Each object (A, B, C, D, and E) may be, for example, a live video image of each party in the communication session (not able to be properly expressed in FIG. 2), a pre-recorded video image of each party in the communication session (not able to be properly expressed in FIG. 2), a still picture of each party in the communication session (like E), an animated representation of each party in the communication session (not able to be properly expressed in FIG. 2), a still representation of each party in the communication session (like A, B, C and D) and the like. It should be noted that the animated representation of each party includes a form of a three dimensional avatar.

The interface 40 may also include a fourth edge 43 of the display 16 having a fourth row 45 of controls, like, for example, "chat" 45(a) to invoke a messaging sub-window 60 as shown in FIG. 4, "record" 45(b) to commence recording of a communication session (stored either on the communications apparatus 18 or the at least one host server 14), "volume" 45(c) to invoke volume controls during the communication session, "setting" 45(d) to invoke video controls during the communication session, "send" 45(e) to transmit data used for the communication session, "▶" 45(f) to reveal more controls. It should be noted that the aforementioned controls are merely illustrative and neither the order nor the functionality is meant to be limiting in any manner. The fourth edge 43 may be selected from: a left edge, a right edge, a bottom edge and a top edge (as shown) of the display 16. The fourth row 45 may be located at an edge which is preferred by a user. The fourth row 45 may be in close proximity to the fourth edge 43 rather than at the fourth edge 43.

The interface 40 also includes a main portion 46 of the display 16 for only showing content 48 relating to a topic for discussion at a particular point in time. In FIG. 2, a graph is shown as the content 48 in the main portion 46 of the display 16, denoting that the content 48 relates to the topic for discussion at the particular point in time. The content 48 may be provided by any party involved in the communication session. When a plurality of the parties are presenting content 48 simultaneously, the host server 14 may arrange the presentation of the content 48 in accordance to a set of rules. The set of rules may include, for example, a first-in-first-out rule, prioritization of content based on hierarchical rank of the communicating party, prioritization of content based on type of communications apparatus used and so forth.

The plurality of the content 48 may be arranged by the host server 14 in an organized manner in the main portion 46 on the display 16 of each communications apparatus 18 such that it is visibly comprehensible by all parties of the communications session. The organized manner may be in the form of either a row/column grid arrangement or an overlaying arrangement. The content 48 may include, for example, graphs (as shown), slide presentations, still images, videos and so forth.

The speaking party's voice is detected by the speaking party's communications apparatus 18 (possibly using a microphone), and such information relating to the voice detection is relayed to the host server 14. This enables the host server 14 to change a state of the speaking party's object in the interface 40 shown on displays 16 on each of the plurality of communications apparatus 18 involved in communication with each other. The change of state may be in a form of, for example, a blinking effect, a single occurrence resizing effect, a transitional blurring effect, a repeated resizing effect, or any combination of the aforementioned. While the change of state is not able to be properly expressed in the figures of the specification, it should not be necessary to do as a skilled person should be able to understand this aspect relating to the change of state.

The interface 40 may also include a sub-portion 50 of the interface 40 for showing a text-identifier of the party(s) speaking at a particular point in time. The text-identifier may be, for example, a name, a pseudo identity, a code and so forth. In this example as shown in FIG. 2, party D has a pseudo identity of "RacerBoi". The sub-portion 50 may be located at any position in the display 16, not necessarily within the main portion 46 as shown.

The interface 40 may further include a functionality to compose and transmit a text message to any party participating in the communications session. This functionality may be invoked when the "chat" 45(a) control is triggered. Triggering the "chat" 45(a) control activates the messaging sub-window 60 as shown in FIG. 4. The texting of messages between the plurality of users may be carried out concurrently during the communications session. The texting of messages allow communication between parties involved in the communication session without the knowledge of parties who are either not supposed or not required to know about the texting-based communication. Thus, a degree of confidentiality is enabled with such texting-based communication. It should be noted that the functionality of texting of messages during a communication session may be disabled if desired/necessary. The disabling of this functionality may be done by one of the parties in the communications session. This party may be, for example, an initiator of the communications session, a hierarchical superior (in an organization) of the other parties in the communications session, a user of specific types of communications apparatus 18 and so forth. Typically, the party in the communication session who is the hierarchical superior would have more control over proceedings of the communications session, specifically as they would have access to more available options when triggering the "▶" 45(f) of the interface 40. This may apply to users of specific types of communications apparatus 18 as well.

FIG. 4 shows a first embodiment of a messaging sub-window 60 used in the interface 40. The messaging sub-window 60 appears when a party participating in the communication session selects the "chat" 45(a) control, where the selection is done in the interface 40. The composition and transmission of the message is done using controls in the sub-window 60. A first panel 62 of the sub-window 60 shows texting which has taken place between parties involved in the texting session. A second panel 64 of the sub-window 60 shows text input by a party participating in the texting session prior to transmission to the other parties of the texting session. A "send" button is activated to transmit text in the second panel 64 to all parties of the texting session. Finally, the sub-window 60 may include a series of selector boxes where all parties of the texting session would be able to select which parties to include in the texting session.

Whilst there has been described in the foregoing description preferred embodiments of the present invention, it will be understood by those skilled in the technology concerned that many variations or modifications in details of design or construction may be made without departing from the present invention.

The invention claimed is:

1. An interface viewable on a display for a communications apparatus used during a session for voice communications between at least two parties, the interface including:
   at least one edge of the display having a row of objects, each object of the row being for representing each of the at least two parties; and
   a main portion of the display being for showing the object of the party speaking at a particular point in time, with a plurality of the objects being shown when a plurality of the parties are speaking at the particular point in time;

wherein the representations shown in the main portion is or are substantially similar to, respectively, the representation or representations corresponding to the object or objects of the row of objects, wherein the object of the speaking party is shown on the main portion when the speaking party's voice is detected by the speaking party's communications apparatus, a host server receiving information from the speaking party's communications apparatus to aid in displaying the object of the speaking party at the particular point in time, wherein if a party is not speaking, a representation substantially similar to the object of the non-speaking party is now shown in the main portion, and wherein the interface further includes a capability to compose and transmit a text message to a party by selecting an object of the party, the functionality of texting of messages during a communication session is capable of being disabled during the communication session, if desired, by a party that is a user of a specific type of communications apparatus.

2. The interface of claim 1, wherein the object is selected from the group consisting of: a live video image of each party, a pre-recorded video image of each party, a still picture of each party, an animated representation of each party, and a still representation of each party.

3. The interface of claim 1, further including a sub-portion of the display being for showing a text-identifier of the party speaking at a particular point in time.

4. The interface of claim 1, wherein the edge is selected from the group consisting of: left edge, right edge, bottom edge and top edge.

5. The interface of claim 1, further including a capability to compose and transmit an email message, wherein composing and transmitting the email message is done using controls in a separate email application.

6. The interface of claim 1, wherein the main portion of the display also shows content provided by one of the parties relating to a topic for discussion at a particular point in time, and wherein the interface is hosted and controlled by the host server, the host server receiving information from a plurality of communications apparatus and controlling the content to show on the interface on displays for each communications apparatus involved in the voice communications.

7. The interface of claim 6, wherein a plurality of the content is organized in a manner of either a row-column grid arrangement or a layering arrangement.

8. The interface of claim 6, wherein the content is selected from the group consisting of: graphs, slide presentations, pictures, and videos.

9. The interface of claim 1, wherein the plurality of objects is organized in a manner of either a row-column grid arrangement or a layering arrangement.

10. The interface of claim 1, further including a secondary portion of the display showing notes recorded by a party of the communications session.

11. The interface of claim 10, wherein there is restricted access to the secondary portion of the display, with access dependent upon either hierarchical level of a party or type of communications apparatus being used.

* * * * *